US009008737B2

(12) United States Patent
Na et al.

(10) Patent No.: US 9,008,737 B2
(45) Date of Patent: Apr. 14, 2015

(54) MOBILE TERMINAL AND AN ANTENNA FOR THE MOBILE TERMINAL

(71) Applicant: LG Electronics Inc., Seoul (KR)

(72) Inventors: Youngsoo Na, Gyeonggi-Do (KR); Joungsub Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 13/666,785

(22) Filed: Nov. 1, 2012

(65) Prior Publication Data

US 2013/0109329 A1 May 2, 2013

(30) Foreign Application Priority Data

Nov. 2, 2011 (KR) ........................ 10-2011-0113548

(51) Int. Cl.
*H04M 1/00* (2006.01)
*H01Q 1/24* (2006.01)
*H01Q 9/04* (2006.01)

(52) U.S. Cl.
CPC ............. *H01Q 1/243* (2013.01); *H01Q 9/0442* (2013.01)

(58) Field of Classification Search
CPC ..................................................... H04B 1/3838
USPC .......................... 455/575.5, 575.7, 90.2, 90.3
See application file for complete search history.

(56) References Cited

U.S. PATENT DOCUMENTS 7,554,494 B2 * 6/2009 Kim et al. ..................... 343/702
2006/0089184 A1 * 4/2006 Kim et al. .................. 455/575.5
2009/0239595 A1 * 9/2009 Sung et al. ................. 455/575.7
2010/0316246 A1 * 12/2010 Cho et al. ...................... 381/386
2011/0193752 A1 * 8/2011 Wang et al. .................. 343/702

FOREIGN PATENT DOCUMENTS

CN 201374380 12/2009
CN 101682119 3/2010

OTHER PUBLICATIONS

European Patent Office Application Serial No. 12006478.7, Search Report dated Mar. 7, 2013, 5 pages.
The State Intellectual Property Office of the People's Republic of China Application Serial No. 201210380676.9, Office Action dated Oct. 21, 2014, 7 pages.

* cited by examiner

*Primary Examiner* — April G Gonzales
(74) *Attorney, Agent, or Firm* — Lee, Hong, Degerman, Kang & Waimey

(57) ABSTRACT

A mobile terminal includes a terminal body, an antenna module coupled to the terminal body and including a radiator for transmitting and receiving radio signals, a circuit board electrically coupled to the antenna module for processing the transmitted and received radio signals, and at least one coupling member positioned proximate to and spaced from the radiator a particular distance for coupling the antenna module to the terminal body. The at least one coupling member is coupled to the radiator.

18 Claims, 6 Drawing Sheets

MOBILE TERMINAL AND AN ANTENNA FOR THE MOBILE TERMINAL

CROSS-REFERENCE TO RELATED APPLICATION

Pursuant to 35 U.S.C. §119(a), this application claims the benefit of earlier filing date and right of priority to Korean Patent Application No. 10-2011-0113548, filed on Nov. 2, 2011, the contents of which is hereby incorporated by reference herein in its entirety.

FIELD OF THE INVENTION

The present invention relates to an antenna for transmitting and receiving radio signals. Although the present invention is suitable for a wide scope of applications, it is particularly suitable for implementation in a mobile terminal.

DESCRIPTION OF THE RELATED ART

Mobile terminals are presently configured to perform various functions. Such functions include data and voice communications, capturing still images and video via a camera, recording audio, playing music files and outputting music via a speaker system, and displaying images and video on a display. Some mobile terminals include additional functionality that supports game playing, while other mobile terminals are also configured as multimedia players. More recently, mobile terminals have been configured to receive broadcast and multicast signals that permit viewing of content, such as videos and television programs.

Generally, terminals can be classified into mobile terminals and stationary terminals based on a presence or non-presence of mobility. Mobile terminals can also be classified into handheld terminals and vehicle mounted terminals based on whether they are configured to be carried by hand.

There are ongoing efforts to support and increase the functionality of mobile terminals. Such efforts include software and hardware improvements, as well as changes and improvements in the structural components that form the mobile terminal. For example, a User Interface (UI) environment is provided in a mobile terminal to enable a user to easily and conveniently search for, or select, a desired function.

Hardware improvements may include structural changes and improvements that allow a user to use a mobile terminal in a more convenient manner. For example, structural changes and improvements may be made to an antenna of the mobile terminal. The mobile terminal antennas transmit and receives electric waves for radio communication and should be designed to implement multiple bandwidths for satisfying various functions such as voice call, Wibro® and digital multimedia broadcasting (DMB). The antennas should also be miniaturized so as to be mounted in the mobile terminal and to reduce the amount of space occupied by the antennas. However, mobile terminal antennas have complicated structures and it is difficult to independently control parameter values that determine antenna characteristics such as resonance frequency, bandwidth and gain.

Mobile terminals often include a connector portion for connection with a connector of an external device. The connector portion is often disposed at one end of a terminal body of the mobile terminal and is exposed to the outside. The antenna is also disposed at one end of the terminal body to aid in reducing Specific Absorption Rate (SAR). However, as the connector portion is often formed of a metallic material, the antenna characteristics may be influenced by the connector portion. Therefore, the antenna should be spaced from the connector portion in order to minimize the influence.

SUMMARY OF THE INVENTION

A mobile terminal of the present invention includes a terminal body, an antenna module coupled to the terminal body, the antenna module including a radiator configured for transmitting and receiving radio signals, a circuit board electrically coupled to the antenna module and configured to process the transmitted and received radio signals, and at least one coupling member positioned proximate to and spaced from the radiator a particular distance. The at least one coupling member may be coupled to the radiator and configured for coupling the antenna module to the terminal body.

In one aspect, the antenna module further includes a carrier positioned proximate to a first end of the terminal body and the radiator is positioned on at least a first surface of the carrier. In another aspect, the at least one coupling member extends through the carrier from the first surface to a second surface opposite the first surface. In a further aspect, the carrier defines at least one opening that includes a recess in the first surface having a depth less than a thickness of the carrier, the thickness of the carrier measured from the first surface to a second surface of the carrier opposite the first surface, and an aperture extending from a bottom surface of the recess to the second surface of the carrier, and each of the at least one coupling member includes a head portion positioned in the recess of a corresponding opening of the at least one opening, a bottom surface of the head portion configured to couple with the bottom surface of the recess, and a body portion positioned in the aperture of the corresponding opening; and the body portion of the at least one coupling member is configured to couple with the terminal body. In an additional aspect, at least a portion of the radiator surrounds at least a portion of a perimeter of the recess of an opening of the at least one opening. In another aspect, a connector portion positioned at the first end of the terminal body and electrically coupled to the circuit board, the connector portion including a terminal configured for electrically coupling with a connector of an external device, wherein the carrier is positioned to cover the connector portion such that the connector portion is positioned between the carrier and the terminal body, and the carrier applies pressure to the connector portion to restrict movement of the connector portion. In a further aspect, the at least one coupling member is configured to increase the pressure applied by the carrier to the connector portion when pressure applied by the bottom surface of the at least one coupling member against the bottom surface of the recess of the corresponding opening is increased. In an additional aspect, the at least one coupling member includes a first screw and a second screw, the first screw is positioned proximate a first side of the connector portion, and the second screw is positioned proximate a second side of the connector portion.

In one aspect, at least a portion of the radiator includes a varying width for transmitting and receiving radio signals on different frequency bands. In another aspect, the at least one coupling member includes a first screw and a second screw, and the first screw and the second screw are spaced apart from each other. In a further aspect, the first screw is configured to resonate at a high frequency band of the different frequency bands, and the second screw is configured to resonate at a low frequency band of the different frequency bands.

In one aspect, the terminal body includes a case formed of a dielectric material, the case forms an outer appearance of the terminal body, and the at least one coupling member is coupled to the case. In another aspect, the particular distance is 3.0 mm or less. In a further aspect, the at least one coupling member is coupled to the radiator and is further configured to change a resonance frequency of the antenna module. In an additional aspect, the radiator is further positioned in at least a portion of an opening of the at least one opening to surround at least a portion of a coupling member of the at least one coupling member. In another aspect, a transmission frequency of the radiator includes a frequency band corresponding to a personal communication system (PCS), an advanced wireless service (AWS), a digital communications network (DCN), or a long term evolution (LTE). In a further aspect, the mobile terminal further includes a speaker positioned within an inner space of the carrier, wherein the inner space of the carrier is configured to resonate sound output from the speaker. In an additional aspect, the carrier includes a first region including the first surface of the carrier, and a second region positioned spaced from the first region and including the inner space, wherein the radiator is patterned on the first surface of the carrier. In an additional aspect, the first region of the carrier extends in a lateral direction of the terminal body proximate the first end of the terminal body, the second region of the carrier extends along a first side of the terminal body and away from the first end of the terminal body.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes “module” and “unit” are used for facilitation of the detailed description of the present invention and do not have meanings or functions different from each other. Therefore, significant meanings or roles are not given to the suffixes themselves and it is understood that the terms ‘module’ and ‘unit’ can be used together or interchangeably.

The present invention can be applicable to various types of terminals.

Examples of such terminals include mobile as well as stationary terminals, such as mobile phones, user equipment, smart phones, DTV, computers, digital broadcast terminals, personal digital assistants, portable multimedia players (PMP), E-books, and navigation systems.

However, by way of non-limiting example only, further description will be provided with regard to a mobile terminal 100. It should be noted that such teachings may apply equally to other types of terminals.

Figure 1:
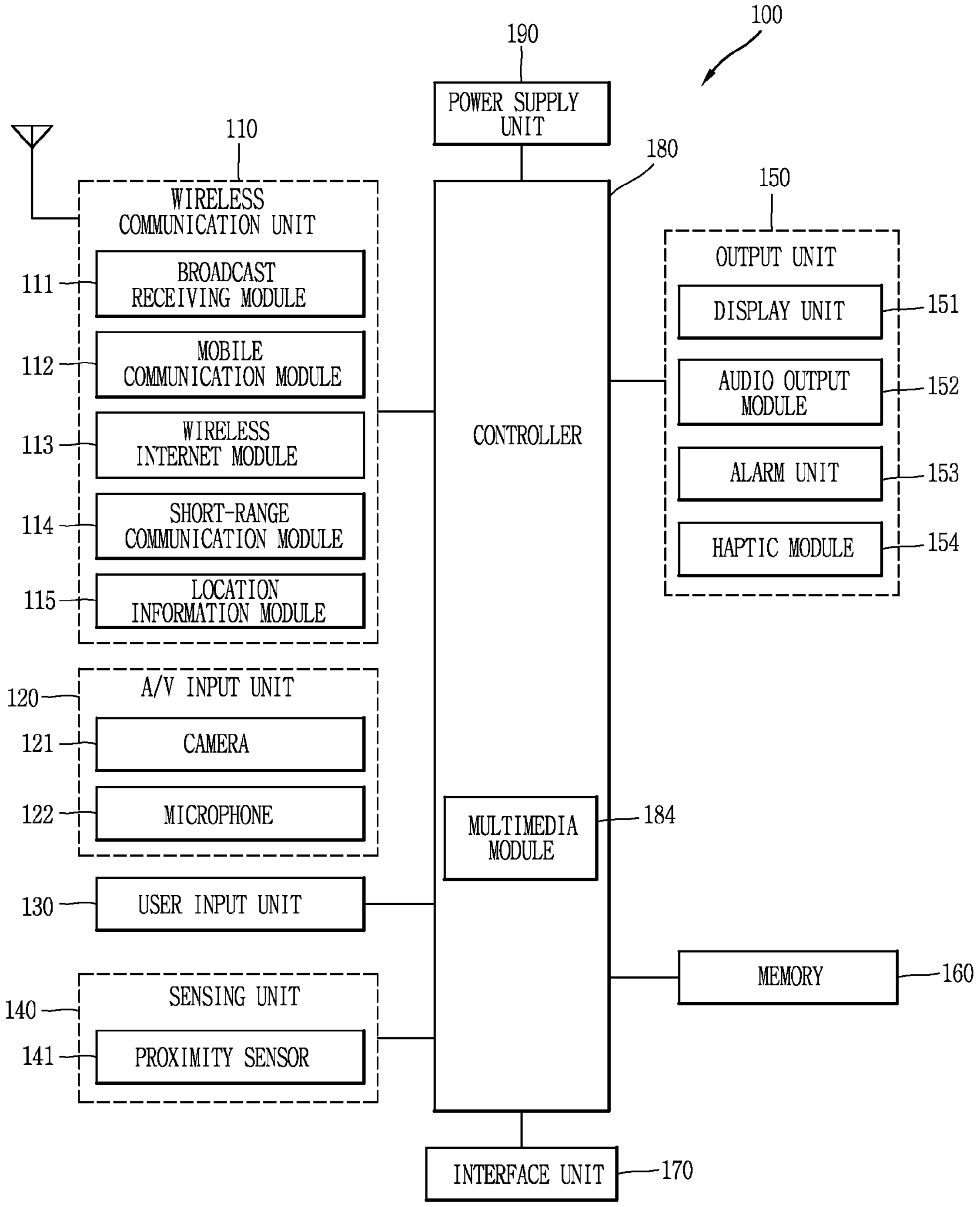
FIG. 1 is a block diagram of a mobile terminal according to an embodiment of the present disclosure.

FIG. 1 is a block diagram of a mobile terminal 100 in accordance with an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a location information module 115. For non-mobile terminals, the wireless communication unit 110 may be replaced with a wired communication unit. The wireless communication unit 110 and a wired communication unit (not shown) may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network, in which case the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. The wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access).

The wireless Internet module 113 may be replaced with a wired Internet module (not shown) in non-mobile terminals. The wireless Internet module 113 and the wired Internet module may be commonly referred to as an Internet module. Moreover, as mentioned in the foregoing description, the wireless Internet module 113 can receive or download the data relevant to the area in which the mobile terminal 100 is located from the external server.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The location information module 115 identifies or otherwise obtains a location of the mobile terminal 100. The location information module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo operated by Europe; a global orbiting navigational satellite system (GLONASS) operated by Russia; Compass operated by China; and a quasi-zenith satellite system (QZSS) operated by Japan.

As a typical example of the GNSS, the location information module 115 is a GPS module. The location information module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The location information module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated during the course of receiving the external audio signal.

The user input unit 130 generates input data in response to user manipulation of an associated input device or devices. Examples of such devices include a keypad, a dome switch, a static pressure/capacitance touchpad, a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components, such as a display and a keypad of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense a presence or absence of power provided by the power supply unit 190 or a presence or absence of a coupling or other connection between the interface unit 170 and an external device. The sensing unit 140 may include a proximity sensor 141.

The output unit 150 generates output relevant to the senses of sight, hearing and touch. The output unit 150 may include a display unit 151, an audio output module 152, an alarm unit 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine which portion of the display unit 151 is touched.

With continued reference to FIG. 1, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen or touch sensor may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern, such as proximity touch distance, proximity touch duration, proximity touch position or proximity touch shift state. Information corresponding to the detected proximity touch action and/or the detected proximity touch pattern may be displayed on the touch screen.

The audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function, such as a call signal receiving sound, or a message receiving sound performed by the mobile terminal 100. The audio output module 152 may include, for example, a receiver, a speaker or a buzzer.

The alarm unit 153 outputs a signal for announcing an occurrence of a particular event associated with the mobile terminal 100. Typical events include a call signal reception, a message reception, a key signal input and a touch input. The alarm unit 153 may output a signal for announcing the event occurrence via vibration as well as a video signal or an audio signal. The video signal is output via the display unit 151 and the audio signal is output via the audio output module 152. Therefore, at least the display unit 151 or the audio output module 152 can be regarded as part of the alarm unit 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is generally used to store various types of data for supporting the processing, control, and storage requirements of the mobile terminal 100. Examples of such data include program instructions for applications operating on the mobile terminal 100, contact data, phonebook data, messages, audio, still pictures, and moving pictures. A recent use history or a cumulative use frequency of each data, such as use frequency for each phonebook, each message or each multimedia, may be stored in the memory 160. Moreover, data for various patterns of vibration and/or sound to be output when a touch input is received at the touch screen may be stored in the memory 160.

The memory 160 may include, for example, a flash memory, a hard disk, a multimedia card micro type memory, a random access memory (RAM), a static random access memory (SRAM), a read-only memory (ROM), an electrically erasable programmable read-only memory (EEPROM), a programmable read-only memory (PROM), a magnetic memory, a magnetic disk an optical disk, or a card type memory, such as SD memory or XD memory. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100.

The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may provide an indication for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 184 that provides multimedia playback. The multimedia module 184 may be configured as part of the controller 180 or may be configured as a separate component. The controller 180 may also perform pattern recognition processing for recognizing a handwriting input performed on the touch screen as a character and/or recognizing a picture drawing input performed on the touch screen as characters or images.

The power supply unit 190 provides power required by the various components of the mobile terminal 100. The power may be internal power, external power, or combinations thereof.

Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 2:
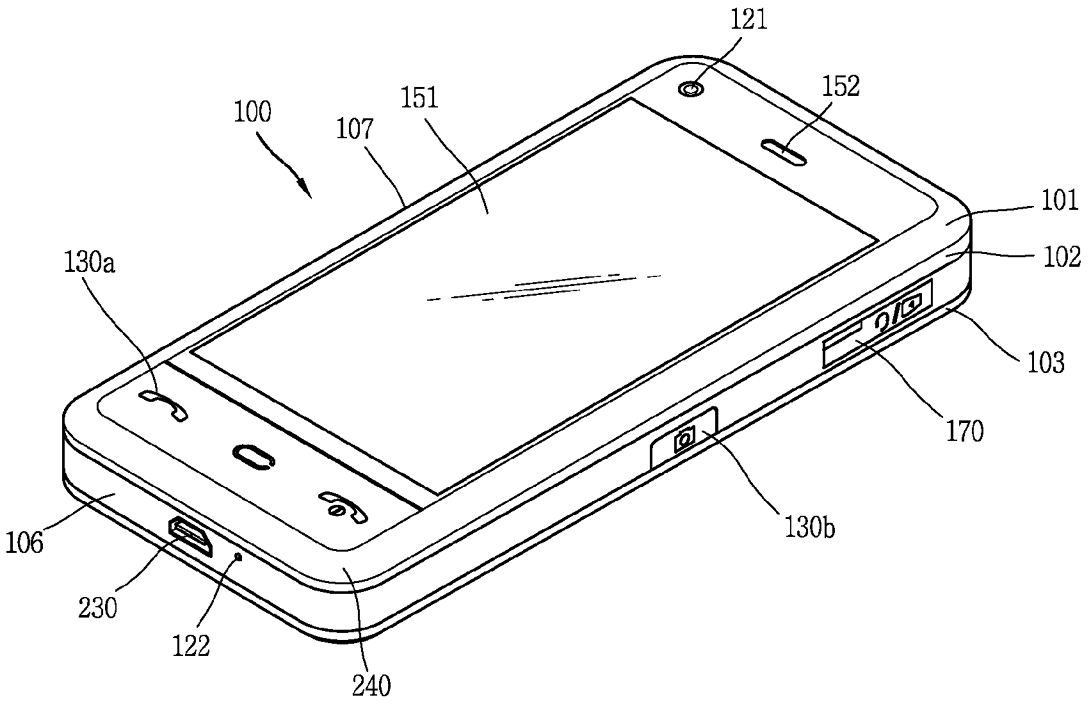
FIG. 2 is a front perspective view of a mobile terminal according to an embodiment of the invention.

FIG. 2 is a front perspective view showing an example of a front of the mobile terminal 100. The mobile terminal 100 of FIG. 2 is depicted as a bar-type terminal body. However, the mobile terminal 100 may be implemented in a variety of different configurations.

Examples of such configurations include a folder-type, a slide-type, a rotational-type, a swing-type and combinations thereof. For clarity, further disclosure will primarily relate to a bar-type mobile terminal 100. However such teachings apply equally to other types of mobile terminals.

The mobile terminal 100 includes a case, such as a casing, housing, or cover, that forms an exterior of the mobile terminal. The case may be divided into a front case 101 and a rear case 102. Various electric/electronic parts are provided in a space between the front case 101 and the rear case 102. A middle case may be further provided between the front case 101 and the rear case 102. The cases can be formed by injection molding of synthetic resin or may be formed of a metallic material, such as stainless steel (STS), aluminum (Al) or titanium (Ti).

The display unit 151, audio output module 152, camera 121, first and second user manipulating units 130*a* and 130*b*, microphone 122 and/or the interface unit 170 can be provided on the terminal body, and more particularly on the front case 101.

The display unit 151 occupies most of a main face of the front case 101. The audio output module 152 and the camera 121 may be provided at an area adjacent to one end portion of the display unit 151, while the first manipulating unit 130*a* and the microphone 122 may be provided at an area adjacent to the other, opposite end portion of the display unit 151. The second manipulating unit 130*b* and the interface unit 170 can be provided on lateral sides of the front and rear cases 101 and 102.

The user input unit 130 (see FIG. 1) may receive a command for controlling an operation of the mobile terminal 100. The user input unit 130 may include a plurality of manipulating units, such as the first and second manipulating units 130*a* and 130*b*. The first and second user manipulating units 130*a* and 130*b* can be named a manipulating portion and may adopt any mechanism of a tactile manner that enables a user to perform a manipulation action by experiencing a tactile feeling.

Content input via the first manipulating unit 130*a* or the second manipulating unit 130*b* can be set to be different. For example, commands such as start, end and scroll can be input via the first manipulating unit 130*a*. Commands for adjusting volume of sound output from the audio output module 152 and for switching the display unit 151 to a touch recognizing mode can be input via the second manipulating unit 130*b*. Many other such configurations may be contemplated.

Figure 3:
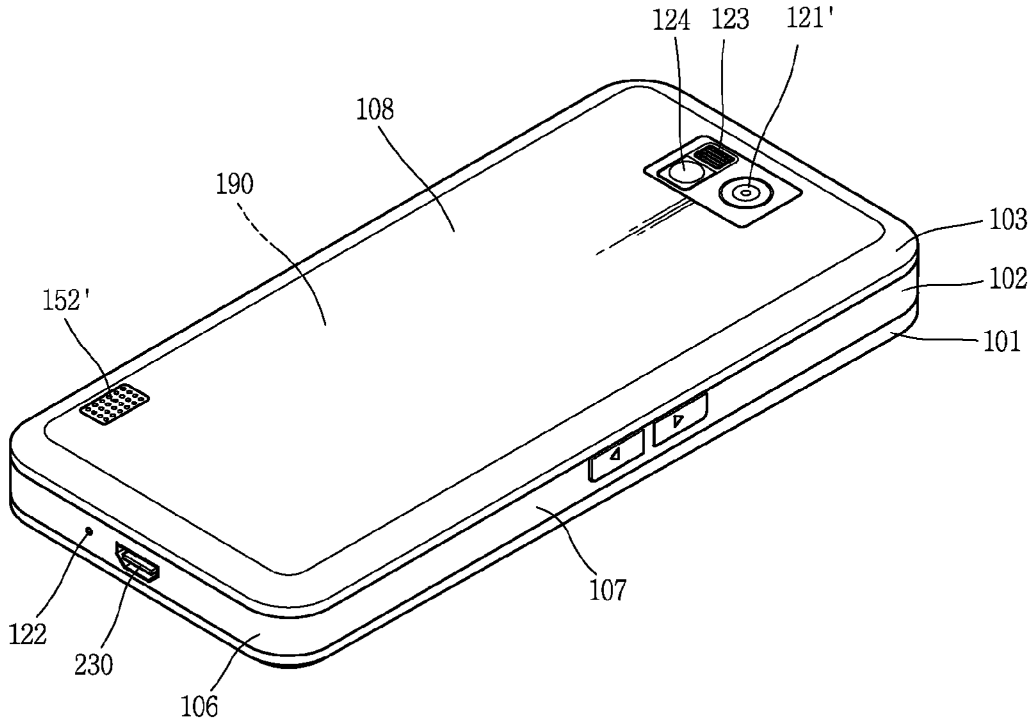
FIG. 3 is a rear perspective view of the mobile terminal of FIG. 2.

FIG. 3 is a rear perspective diagram of the mobile terminal 100 shown in FIG. 2. Other embodiments, configurations and arrangements may also be provided.

As shown in FIG. 3, an additional camera 121' can be provided on a rear side of the terminal body, and more particularly, on the rear case 102. The camera 121' on the rear case 102 has a photographing direction that is substantially opposite to that of the camera 121 shown in FIG. 2 and may have a different resolution.

For example, the camera 121 may use a smaller number of pixels than the camera 121', and thereby have a relatively lower resolution, to capture and transmit an image of the user's face for a video call. On the other hand, the camera 121' may use a greater number of pixels than the camera 121, and thereby have a relatively greater resolution in general, for capturing an image of a general subject for photography without transmitting the captured image. The cameras 121 and 121' may be capable of being rotated in relation to the terminal body or to pop-up from the terminal body.

A flash 123 and a mirror 124 may be disposed adjacent to the camera 121'. The flash 123 projects light toward a subject when photographing the subject using the camera 121'. When a user attempts to take a picture of himself/herself (self-photography) using the camera 121', the mirror 124 enables the user to view his/her face reflected by the mirror 124.

An additional audio output module 152' can be disposed at the rear side of the terminal body. The additional audio output module 152' facilitates a stereo function in conjunction with the audio output module 152 illustrated in FIG. 2 and may be used for implementation of a speakerphone mode when communicating via the mobile terminal 100.

The power supply unit 190 for supplying power to the mobile terminal 100 may be provided in the terminal body. The power supply unit 190 can be configured to be built within the terminal body or to be detachably connected to the terminal body.

Figure 4:
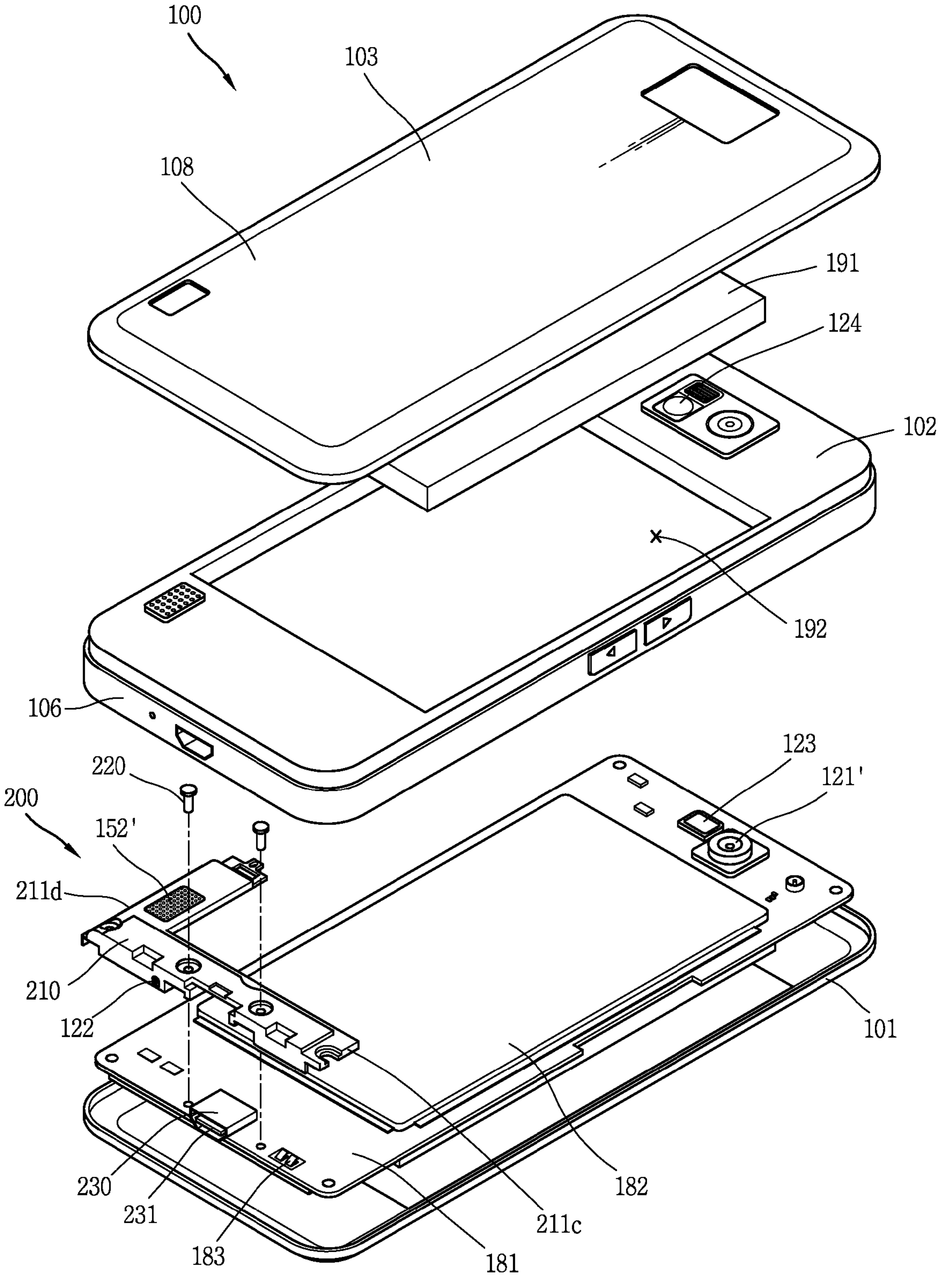
FIG. 4 is a perspective view of the mobile terminal of FIG. 3 in a disassembled condition and including an antenna device.

Referring to FIGS. 2-4, the terminal body includes a connector portion 230 positioned at one end, such as a first end 106, of the terminal body. The connector portion 230 is an example of the interface unit 170 which connects the mobile terminal 100 to an external device. For example, the connector portion 230 may be a data port for transmitting and receiving data to/from an external device, or a power port for receiving power from the outside.

Antennas may be disposed in the terminal body. For example, the mobile terminal 100 may include an antenna for mobile communication and an antenna for receiving broadcasting signals or wireless Internet signals. The antennas may be combined together to integrally provide various wireless communication services.

FIG. 4 is a disassembled perspective view of the mobile terminal 100 of FIG. 3. Referring to FIG. 4, a circuit board 181 is positioned within the terminal body. The circuit board 181 may be mounted to the front case 101 or the rear case 102, or to an additional inner structure. In FIG. 4, the circuit board 181 is depicted as covered by an inner surface of the rear case 102.

Various electronic devices may be mounted on a surface of the circuit board 181. The circuit board 181 may also include a shield member 182 for protecting the electronic devices mounted on the circuit board 181. As an example, the shield member 182 may be a metallic plate.

The circuit board 181 is an example of the controller 180 (FIG. 1) for operating various components of the mobile terminal 100. The mobile terminal may include a plurality of circuit boards 181 and the combination of the plurality of circuit boards may function as the controller 180. The circuit board 181 is electrically coupled to an antenna device 200 and processes a radio signal corresponding to a radio electromagnetic wave transceived by the antenna device 200.

The rear case 102 may include a recessed accommodation portion 192 for accommodating a battery 191. The accommodation portion 192 may include an open bottom surface through which the shield member 182 is exposed to the outside of the mobile terminal 100 when the battery 191 is removed. In this manner, the shield member 182 forms the bottom of the accommodation portion 192. The battery 191 and the accommodation portion 192 are an example of the power supply unit 190 (FIG. 1).

A battery cover 103 for covering the battery 191 and the accommodation portion 192 may be detachably mounted to the rear case 102. The battery cover 103 is an example of the case that forms the outer appearance of the terminal body and may cover the entire rear surface 108 of the mobile terminal.

When the connector portion 230 is positioned at the first end 106 of the terminal body, the connector portion may be positioned proximate to the microphone 122. The mobile terminal 100 may be coupled to external devices, such as a computer, a printer, a multimedia device, or a memory device via a data cable coupled to the connector portion 230. Alternatively, the connector portion 230 may be implemented as a power port coupled to a connector or a cradle or a docking station to enable the mobile terminal 100 to receive power. On the other hand, the connector portion may be coupled to an external speaker.

The connector portion 230 includes a terminal 231 that may be connected to a connector of the external device. As an example, the connector portion 230 may be a Universal Serial Bus (USB) port.

The connector portion 230 is electrically coupled to the circuit board 181. For example, the connector portion 230 may be mounted onto the circuit board 181 via a Surface Mount Technology (SMT) process. Lead or one of other materials commonly known in the art for use in the SMT process is patterned on the circuit board 181, and the connector portion 230 is positioned on the lead or other material using mounting equipment. Thereafter, the connector portion 230 passes through a reflow oven in which the lead or other material is melted to solder the connector portion to the circuit board 181. The patterned lead or other material may form a coupling layer between the connector portion 230 and the circuit board 181. The coupling layer is formed as the patterned lead or other material is melted in the reflow oven and subsequently solidified upon cooling.

The antenna device 200 transceives radio signals. To reduce Specific Absorption Rate (SAR), the antenna device 200 may be positioned toward the first 106 (FIG. 4) end of the terminal body proximate to the microphone 122. In this manner, the antenna device 200 is positioned away from the audio output module 152 (FIG. 2). The antenna device 200 may be configured to transceive radio signals of multiple bands. The mobile terminal may include a plurality of antenna devices, each performing a different function. To minimize interference between the plurality of antenna devices 200, the antenna devices may be spaced apart from each other a set distance.

When both the connector portion 230 and the antenna device 200 are positioned toward the first end 106 of the terminal body, antenna characteristics such as a resonance frequency, bandwidth and gain may be influenced by the connector portion 230 when the connector portion includes a metallic material.

As mobile terminals 100 tend to be relatively small, it is an object of the present invention to include a structure for tuning the antenna device 200 such that positioning the antenna device proximate to the connector portion 230 does not degrade performance of the antenna device. Hereinafter, the antenna device 200 and the structure will be explained in more detail with reference to the attached drawings.

Figure 5:
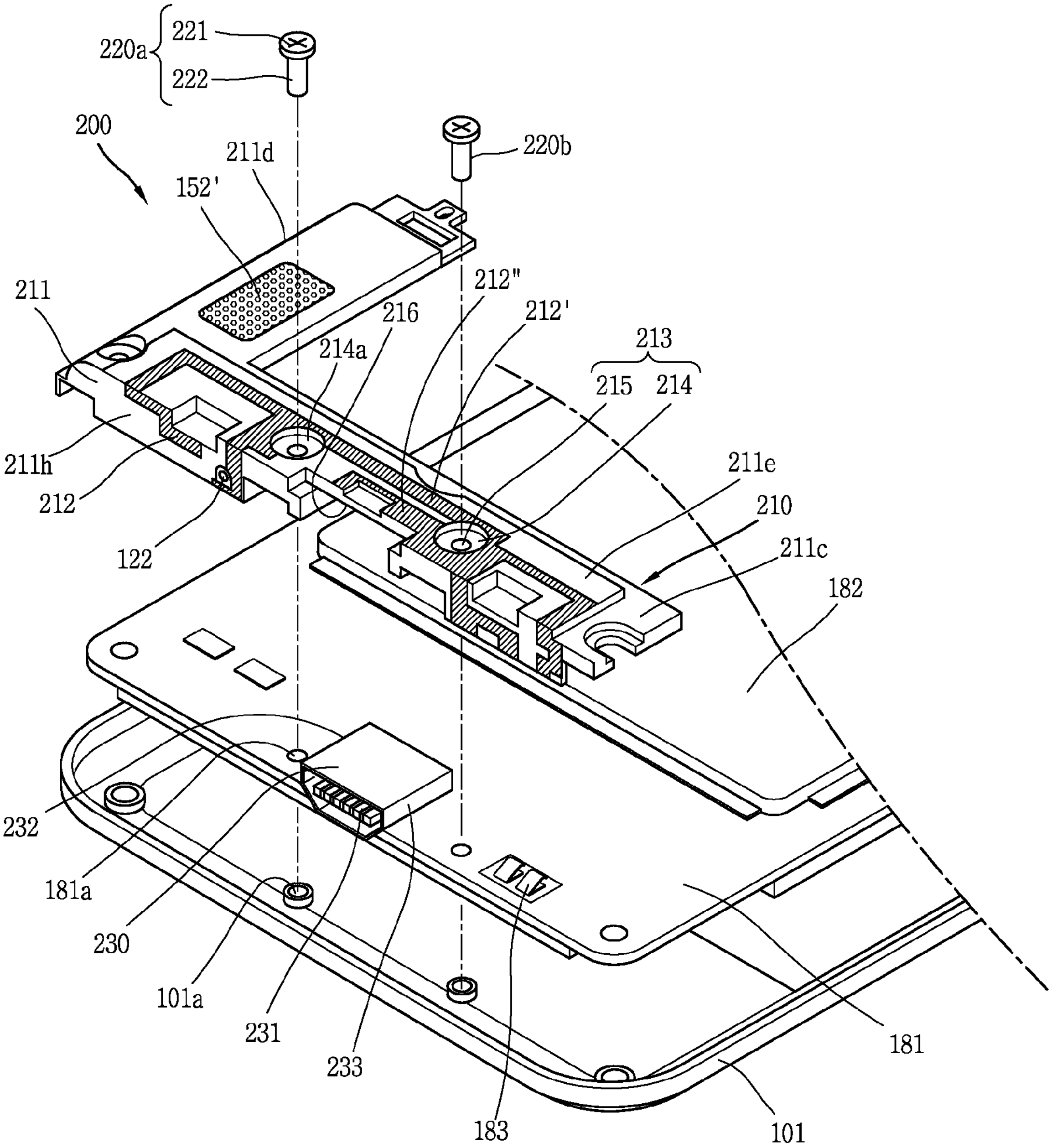
FIG. 5 is an enlarged view of an antenna device of the mobile terminal of FIG. 4 and a coupling structure of the antenna.
Figure 6:
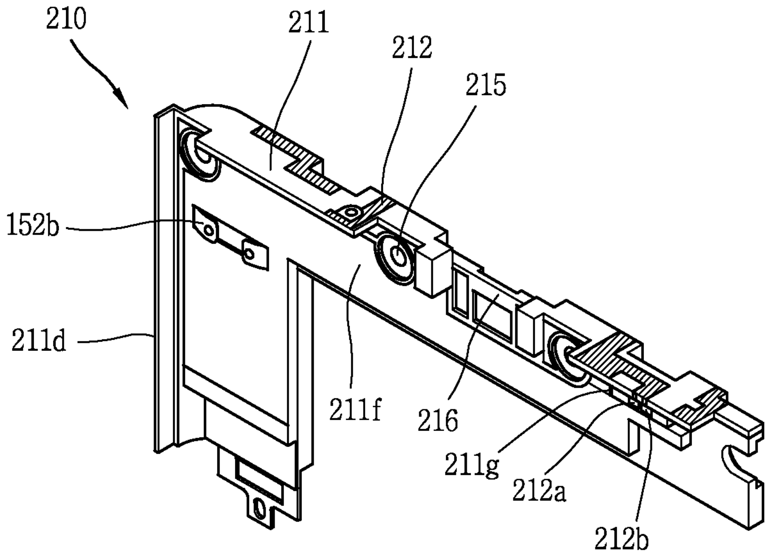
FIG. 6 is a bottom perspective view of an antenna module of the mobile terminal of FIG. 4.
Figure 7:
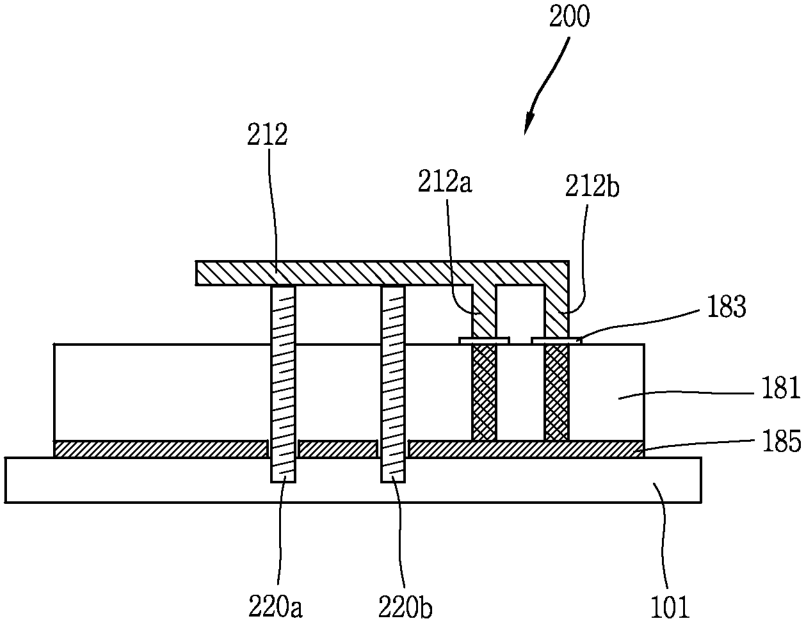
FIG. 7 is a conceptual view of an electric connection path of an antenna device of the mobile terminal of FIG. 4.

FIG. 5 is an enlarged view of the antenna device 200 of the mobile terminal 100 of FIG. 4 and a coupling structure thereof, FIG. 6 is a bottom perspective view of an antenna module 210 of FIG. 4, and FIG. 7 is a conceptual view of an electric connection path of the antenna device 200 of FIG. 4. Referring to FIGS. 5 to 7, the antenna device 200 includes an antenna module 210 and at least one coupling member 220. The antenna module 210 may be mounted to and electrically coupled to the circuit board 181. The at least one coupling member 220 fixes the antenna module 210 to the terminal body.

The antenna module 210 includes a carrier 211 and a radiator 212. The carrier 211 forms the appearance of the antenna module 210 and includes at least one surface on which the radiator 212 may be patterned or positioned. The carrier 211 may be formed of a synthetic resin and may be positioned proximate to the first end of the terminal body.

In FIG. 4, the carrier 211 is depicted as being covered by the rear case 102. However, the carrier 211 may be covered by the battery cover 103 when mounted to the rear case 102 so as to be exposed to the outside when the battery cover is removed. In this manner, the carrier 211 is covered merely by the battery cover 103 so that transceiving performance of the antenna device 200 may be enhanced.

The radiator 212 is positioned on at least one surface, such as a first surface 211*e*, of the carrier 211. The radiator 212 is formed of a conductive material in a preset pattern and is electrically coupled to the circuit board 181 so that transceived radio signals can be processed.

The radiator 212 may extend to another surface, such as a third surface 211*g*, of the carrier 211. The third surface 211*g* of the carrier 211 faces the circuit board 181 and a grounding terminal 212*a* and a feeding terminal 212*b* are positioned on the third surface. The grounding terminal 212*a* and the feeding terminal 212*b* are electrically coupled to the circuit board 181.

The radiator 212 may be configured to transceive radio signals of multiple bands. For example, referring to FIG. 5 the radiator 212 may include a first radiating pattern 212' and a second radiating pattern 212" that diverge from each other on at least one point of the carrier 211. The first radiating pattern 212' and second radiating pattern 212" may be formed, for example, by printing conductive ink on at least one surface, such as the first surface 211*e* of the carrier 211, and then plating a metallic material on the conductive ink. Alternatively, the first radiating pattern 212' and second radiating pattern 212" may be formed by attaching a conductive pattern printed on a flexible printed circuit board (FPCB) onto the carrier 211.

The first radiating pattern 212' and second radiating pattern 212" may be configured to transceive radio signals of different frequency bands. For example, the first radiating pattern 212' may be configured to transceive radio signals of a digital communications network (DCN) frequency band, while the second radiating pattern 212" may be configured to transceive radio signals of personal communication system (PCS), advanced wireless service (AWS). At least a portion of the second radiating pattern 212" may have a varying width to enable radio signals of different frequency bands to be transceived.

Referring to FIG. 7, the grounding terminal 212*a* extends from the first radiating pattern 212' and second radiating pattern 212" to ground the first radiating pattern 212' and second radiating pattern 212" to the circuit board 181. The feeding terminal 212*b* is electrically coupled to the circuit board 181 in a shape similar to a Planar Inverted-F Antenna (PIFA). A connection terminal 183 may be mounted to the circuit board 181 and be coupled to the grounding terminal 212*a* for a ground connection and the feeding terminal 212*b* for a feeding connection.

All paths for electrically coupling the radiator 212 and the circuit board 181 to each other are coupled to a ground 185. The ground 185 may be formed at a specific layer of the circuit board 181, or may be an additional conductor positioned inside the terminal body. In this manner, the first radiating pattern 212' and second radiating pattern 212" are coupled to the ground 185 of the circuit board 181 via the connection terminal 183 on the circuit board 181. However, the present invention is not so limited. For example, the first radiating pattern 212' and second radiating pattern 212" may be directly coupled to an additional conductor positioned inside the terminal body. In this manner, the radiator 212 may be directly connected to the ground 185.

The radiator 212 may transceive radio electromagnetic waves of a specific frequency band. The specific frequency band may correspond to PCS, AWS, DCN, long term evolution (LTE), and other technologies under development.

As shown in FIG. 5, the carrier 211 includes at least one opening 213 including a recess 214 in the first surface of the carrier. A thickness of the carrier is measured from the first surface 211*e* to a second surface 211*f* of the carrier opposite the first surface. The recess 214 has a depth less than the thickness of the carrier 211. The at least one opening 213 also includes an aperture 215 extending from a bottom surface 214*a* of the recess 214 to the second surface 211*f* of the carrier 211. Each coupling member 220 of the at least one coupling member 220 may be inserted into the aperture 215 of a corresponding opening of the at least one opening 213 to fix the carrier 211 to the terminal body.

More particularly, each of the at least one coupling member 220 includes a head 221 positioned in the recess 214 of a corresponding opening of the at least one opening 213, and a body 222 positioned in the aperture 215 of the corresponding opening of the at least one opening 213. Moreover, the body 222 of each of the at least one coupling member 220 extends beyond the second surface 211*f* of the carrier 211 and couples to the terminal body. The at least one coupling member 220 may be a screw and the body 222 of the at least one coupling member 220 may have screw threads for coupling the body 222 to the body terminal.

The at least one coupling member 220 is formed of a conductive material, and is disposed proximate to the radiator 212. The at least one coupling member 220 is spaced from the radiator a particular distance and is coupled to the radiator. The particular distance between the at least one coupling member 220 and the radiator 212 is 3.0 mm or less to enable coupling between the at least one coupling member 220 and the radiator 212.

The at least one coupling member 220 may include a plurality of coupling members 220. For example, the plurality of coupling members 220 may include a first screw 220*a* and a second screw 220*b* spaced apart from each other. The first screw 220*a* and second screw 220*b* may be positioned proximate to the first radiating pattern 212' and second radiating pattern 212". Moreover, the first screw 220*a* and second screw 220*b* may be coupled to the first radiating pattern 212' and second radiating pattern 212".

The head 221 of each of the at least one coupling member 220 may be coupled to the radiator 212. The head 221 of each of the at least one coupling member 220 is positioned in the recess 214 of a corresponding opening of the at least one opening 213 in the carrier 211 and positioned proximate to the radiator 212 at the particular distance. The radiator 212 may be formed to surround at least a portion of a perimeter of the recess 214 of an opening of the at least one opening 213 to enable the coupling between the head 221 of the at least one coupling member 220 and the radiator 212. The portion of the radiator 212 surrounding the at least a portion of the perimeter of the recess 214 may be formed in an arc shape, as depicted in FIG. 5.

As depicted in FIGS. 5 and 6, the radiator 212 may extend along the first surface 211*e* of the carrier 211. A portion of the radiator 212 may also be bent to transition from the first surface 211*e* of the carrier 211 to a fourth surface 211*h* of the carrier and extend a preset length along the fourth surface 211*h* to reduce a space occupied by the radiator 212 while enabling tranceiving of radio signals of a specific frequency band.

With the at least one coupling member 220 positioned in an opening of the at least one opening 213 and coupled to the terminal body, the at least one coupling member 220 is oriented in a direction crossing the radiator 212. Moreover, with the at least one coupling member 220 coupled with the radiator 212, the at least one coupling member 2 may be used to change a resonance frequency of the antenna module. The at least one coupling member 220 is also coupled to the radiator 212 for impedance matching in the form of a short diverged line. Furthermore, the at least one coupling member 220 may function as a type of stub.

The at least one coupling member 220 is not electrically coupled to the circuit board 181. However, the head 221 of the at least one coupling member 220 may be electrically coupled to the radiator 212. The front case may be formed of a dielectric material. An end of the body 222 of the at least one coupling member 220, away from the head 221, may be coupled to an aperture 101*a* in the front case 101 via a hole 181*a* in the circuit board 181.

As explained previously, the at least one coupling member 220 is positioned proximate to and spaced from the radiator 212 a particular distance and is coupled to the radiator 212. As a result, the at least one coupling member 220 may used as a resonance changing device to implement impedance matching. In this manner, the antenna may have tuned characteristics.

As previously explained, the connector portion 230 and the antenna device 200 may be positioned proximate to the first end of the terminal body. Accordingly, the antenna characteristics may be influenced by the connector portion 230 when the connector portion 230 is formed of a metallic material. As will be explained, this embodiment of the present invention provides a structure for arranging the connector portion 230 and the antenna device 200 proximate to each other without degrading performance of the antenna device 200.

The carrier 211 may be formed and positioned to cover the connector portion 230 to restrict movement of the connector portion 230. More particularly, the carrier 211 may include a recessed pressing portion 216 corresponding to the connector portion 230. In this manner, when the at least one coupling member 220 is coupled to the terminal body through the carrier 211 to fix the carrier 211 to the terminal body, the pressing portion 216 presses the connector portion 230 to restrict movement of the connector portion 230.

The first screw 220*a* and second screw 220*b* may be positioned proximate to opposing sides of the connector portion 230, such as a first side 232 and a second side 233 of the connector portion 230. The first screw 220*a* and second screw 220*b* stably fix the carrier 211 to the terminal body. During screw-coupling of the first screw 220*a* and second screw 220*b* to the terminal body, the pressing portion 216 presses the connector portion 230 to restrict movement of the connector portion 230.

Since the combination of the antenna module 210 and the at least one coupling member 220 fixedly-supports the connector portion 230, an additional structure for fixing the connector portion 230 is not required. Since the at least one coupling member 220 performs impedance matching, the antenna module 210 and the connector portion 230 may be positioned proximate to each other, which may minimize an area occupied by the antenna module 210 and the connector portion and prevent performance degradation of the antenna device 200. Additionally, since it is not necessary to space the antenna device 200 far from the connector portion 230, an area of a bezel portion 240 (FIG. 2) of the mobile terminal 100 may be reduced.

Figure 8:
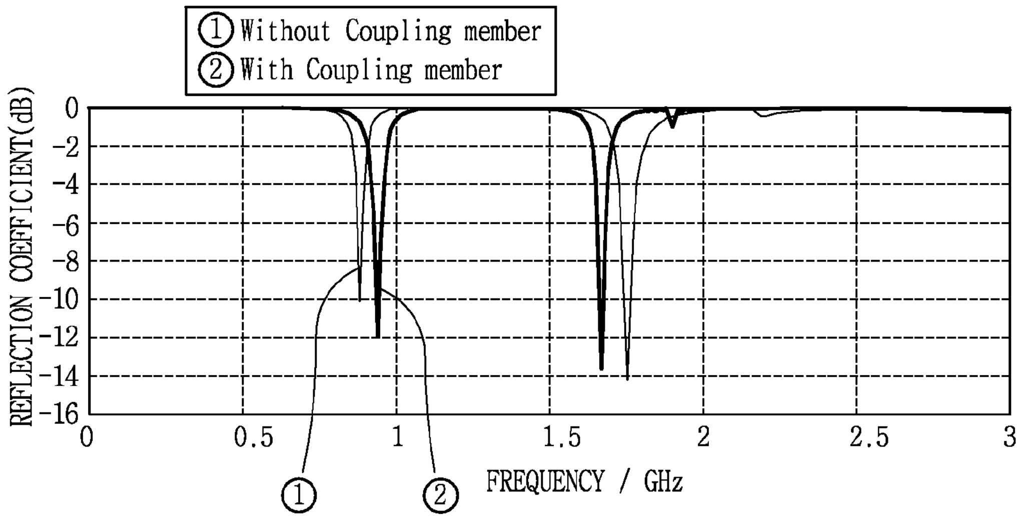
FIG. 8 is a graph depicting performance of the antenna device of FIG. 4.

FIG. 8 is a graph depicting performance characteristics of the antenna device 200 of FIG. 4. The graph "1" (indicated by the thin solid line) represents a reflection coefficient of the radiator 212 when the at least one coupling member 220 is not provided. The graph "2" (indicated by the thick solid line) represents a reflection coefficient of the radiator 212 when the radiator 212 is coupled to the at least one coupling member 220.

Referring to the graphs "1" and "2", the radiator 212 resonates at different frequency bands (i.e., at a low frequency band and a high frequency band). As shown in the graph "2", when the radiator 212 is coupled to the at least one coupling member 220, antenna characteristics such as resonance frequency, bandwidth and gain change.

More particularly, the first screw 220 may be formed to resonate at a high frequency and the second screw 220*b* may be formed to resonate at a low frequency band. In this manner, if only the first screw 220*a* of the at least one coupling member 220 is coupled to the radiator 212, the antenna characteristics at a high frequency band change.

Referring to the graphs "1" and "2", even if the antenna characteristics change as the at least one coupling member 220 and the radiator 212 are coupled to each other, a change of the reflection coefficient is minimal. Accordingly, a resonance point of the radiator 212 may be shifted without reducing power.

Figure 9:
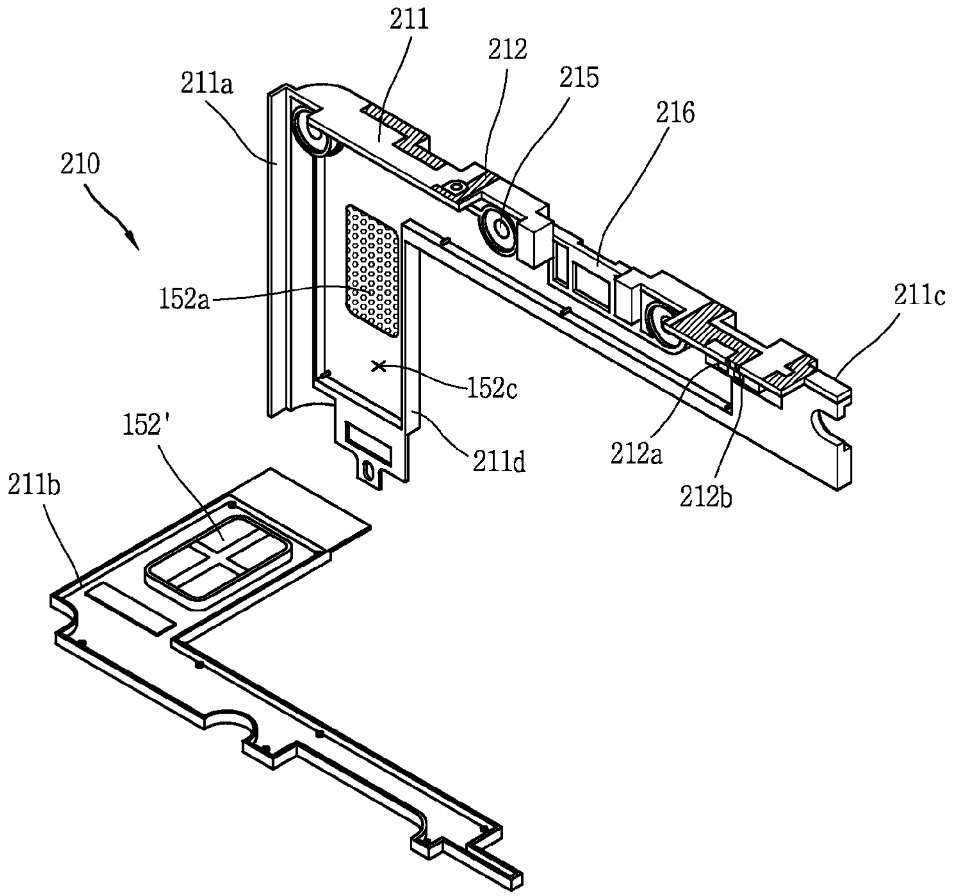
FIG. 9 is a perspective view of the antenna module of FIG. 4 in a disassembled condition.

FIG. 9 is a perspective view of the antenna module of FIG. 4 in a disassembled condition. Referring to FIG. 9, together with FIGS. 4 to 7, the carrier 211 may include a first case 211*a* and a second case 211*b* that form an outer appearance of the carrier 211. The speaker 152' for outputting sound may be positioned within an inner space 152*c* defined by the first case 211*a* and the second case 211*b*. The speaker 152' may be electrically coupled to the circuit board 181 via a connection terminal 152*b* (FIG. 6).

The inner space 152*c* serves as a resonance sound chamber. An aperture 152*a* may be formed proximate to the speaker 152' so that sound can be directly output through the aperture. Another aperture may be formed in the carrier 211 at a preset distance from the speaker 152' to enhance performance of low sounds.

The carrier 211 is divided into a first region 211*c* and a second region 211*d*. The radiator 212 is patterned on the first region 211*c*, and the speaker 152' is positioned in the second region 211*d*. The second region 211*d* is spaced from the first region. As depicted in FIGS. 4-7, the first region 211*c* may extend laterally across the terminal body proximate the first end 106 of the terminal body, and the second region may extend longitudinally along a first side 107 of the terminal body and away from the first end 106 of the terminal body.

The above configurations have a number of advantages. First, the at least one coupling member 220 is positioned proximate to the radiator 212 at a particular distance for coupling the at least one coupling member to the radiator. Therefore, the at least one coupling member 220 may be used as a resonance changing device to implement impedance matching. In this manner, the antenna module 210 may have tuned characteristics.

Second, the antenna module 210 may be positioned to cover the connector portion 230 and the at least one coupling member 220 may be coupled to the terminal body through the carrier 211 to fix the antenna module 210 to the terminal body and allow the antenna module 210 to press against the connector portion 230 to restrict movement of the connector portion. In this manner, an area occupied by the antenna device 200 and connector portion 230 is minimized and degradation of performance of the antenna device is prevented. Furthermore, since there is no need to space the antenna device 200 away from the connector portion 230, an area of the bezel portion 240 can be reduced.

The foregoing embodiments and advantages are merely exemplary and are not to be construed as limiting. The present teachings can be readily applied to other types of apparatuses. This description is intended to be illustrative only, and not to limit the scope of the appended claims. Many alternatives, modifications, and variations will be apparent to those skilled in the art upon perusal of this disclosure. The features, structures, methods, and other characteristics of the exemplary embodiments described herein may be combined in various ways to obtain additional and/or alternative exemplary embodiments.

As the features described previously may be embodied in several forms without departing from the characteristics thereof, it should also be understood that the above-described embodiments are not limited by any of the details of the foregoing description, unless otherwise specified, but rather should be construed broadly within its scope as defined in the appended claims and their equivalents.

What is claimed is:

1. A mobile terminal, comprising:

a terminal body;

an antenna module coupled to the terminal body, the antenna module comprising a carrier positioned proximate to a first end of the terminal body and a radiator positioned on at least a first surface of the carrier and configured for transmitting and receiving radio signals;

a circuit board electrically coupled to the antenna module and configured to process the transmitted and received radio signals; and at least one coupling member electrically coupled to the radiator and configured for coupling the antenna module to the terminal body, wherein the carrier comprises at least one opening, wherein each of the at least one coupling member is inserted into a corresponding opening of the at least one opening and coupled to the terminal body so as to fix the antenna module to the terminal body, and wherein the at least one coupling member is positioned proximate to the radiator at a particular distance so as to be electrically coupled to the radiator.

2. The mobile terminal of claim, wherein the at least one coupling member extends through the carrier from the first surface to a second surface opposite the first surface.

3. The mobile terminal of claim 1, wherein:

the opening comprising:

a recess in the first surface having a depth less than a thickness of the carrier, the thickness of the carrier measured from the first surface to a second surface of the carrier opposite the first surface; and an aperture extending from a bottom surface of the recess to the second surface of the carrier; and each of the at least one coupling member comprises a head portion positioned in the recess of a corresponding opening of the at least one opening, a bottom surface of the head portion configured to couple with the bottom surface of the recess, and a body portion positioned in the aperture of the corresponding opening; and the body portion of the at least one coupling member is configured to couple with the terminal body.

4. The mobile terminal of claim 3, wherein at least a portion of the radiator surrounds at least a portion of a perimeter of the recess of an opening of the at least one opening.

5. The mobile terminal of claim 3, further comprising:

a connector portion positioned at the first end of the terminal body and electrically coupled to the circuit board, the connector portion comprising a terminal configured for electrically coupling with a connector of an external device, wherein the carrier is positioned to cover the connector portion such that the connector portion is positioned between the carrier and the terminal body, and the carrier applies pressure to the connector portion to restrict movement of the connector portion.

6. The mobile terminal of claim 5, wherein the at least one coupling member is configured to increase the pressure applied by the carrier to the connector portion when pressure applied by the bottom surface of the at least one coupling member against the bottom surface of the recess of the corresponding opening is increased.

7. The mobile terminal of claim 5, wherein:

the at least one coupling member comprises a first screw and a second screw;

the first screw is positioned proximate a first side of the connector portion; and the second screw is positioned proximate a second side of the connector portion.

8. The mobile terminal of claim 1, wherein at least a portion of the radiator comprises a varying width for transmitting and receiving radio signals on different frequency bands.

9. The mobile terminal of claim 8, wherein:

the at least one coupling member comprises a first screw and a second screw; and the first screw and the second screw are spaced apart from each other.

10. The mobile terminal of claim 9, wherein:

the first screw is configured to resonate at a high frequency band of the different frequency bands; and the second screw is configured to resonate at a low frequency band of the different frequency bands.

11. The mobile terminal of claim 1, wherein:

the terminal body comprises a case formed of a dielectric material;

the case forms an outer appearance of the terminal body; and the at least one coupling member is coupled to the case.

12. The mobile terminal of claim 1, wherein the particular distance is 3.0 mm or less.

13. The mobile terminal of claim 1, wherein:

the at least one coupling member is coupled to the radiator and is further configured to change a resonance frequency of the antenna module.

14. The mobile terminal of claim 3, wherein:

the radiator is further positioned in at least a portion of an opening of the at least one opening to surround at least a portion of a coupling member of the at least one coupling member.

15. The mobile terminal of claim 1, wherein a transmission frequency of the radiator includes a frequency band corresponding to a personal communication system (PCS), an advanced wireless service (AWS), a digital communications network (DCN), or a long term evolution (LTE).

16. The mobile terminal of claim 1, further comprising:

a speaker positioned within an inner space of the carrier, wherein the inner space of the carrier is configured to resonate sound output from the speaker.

17. The mobile terminal of claim 16, wherein the carrier comprises:

a first region on which the radiator is patterned, the first region comprising at least one portion of the inner space; and a second region spaced from the first region, and on which the speaker is arranged.

18. The mobile terminal of claim 17, wherein:

the first region of the carrier extends in a lateral direction of the terminal body proximate the first end of the terminal body, and the second region of the carrier extends along a first side of the terminal body and away from the first end of the terminal body.

* * * * *